United States Patent
Chalapathy et al.

(10) Patent No.: US 9,923,781 B2
(45) Date of Patent: Mar. 20, 2018

(54) DESIGNATED FORWARDER (DF) ELECTION AND RE-ELECTION ON PROVIDER EDGE (PE) FAILURE IN ALL-ACTIVE REDUNDANCY TOPOLOGY

(71) Applicant: Telefonaktiebolaget L M Ericsson (publ), Stockholm (SE)

(72) Inventors: Prasanna Chalapathy, San Jose, CA (US); Antoni Przygienda, Sunnyvale, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 160 days.

(21) Appl. No.: 14/945,301

(22) Filed: Nov. 18, 2015

(65) Prior Publication Data
US 2017/0141963 A1    May 18, 2017

(51) Int. Cl.
*H04L 12/24* (2006.01)
*H04L 12/46* (2006.01)
*H04L 12/723* (2013.01)
*H04L 12/947* (2013.01)

(52) U.S. Cl.
CPC .......... *H04L 41/12* (2013.01); *H04L 12/4641* (2013.01); *H04L 41/08* (2013.01); *H04L 45/50* (2013.01); *H04L 49/25* (2013.01)

(58) Field of Classification Search
CPC ......... H04L 41/12; H04L 41/08; H04L 49/25; H04L 12/4641; H04L 45/50
See application file for complete search history.

(56) References Cited

U.S. PATENT DOCUMENTS

| 8,724,456 | B1* | 5/2014 | Hong | G06F 11/00 370/225 |
| 9,019,814 | B1* | 4/2015 | Mohanty | H04L 45/00 370/219 |
| 2010/0020680 | A1* | 1/2010 | Salam | H04L 43/0811 370/225 |
| 2010/0290472 | A1* | 11/2010 | Raman | H04L 45/00 370/395.2 |
| 2011/0258346 | A1* | 10/2011 | Said | H04L 45/00 709/249 |

(Continued)

OTHER PUBLICATIONS

RFC 7432: Handley, et al., "Internet Denial-of-Service Considerations," Network Working Group Request for Comments, the IETF Trust, Nov. 2006, 38 pages.

*Primary Examiner* — Tejis Daya
(74) *Attorney, Agent, or Firm* — Nicholson De Vos Webster & Elliott, LLP

(57) ABSTRACT

A method is implemented by a network device functioning as a provider edge (PE) device to determine a designated forwarder (DF) for sending broadcast, unknown unicast or multicast (BUM) traffic to a customer edge (CE) device, which is connected to a plurality of PE devices in an Ethernet virtual private network (EVPN) instance on a given Ethernet segment. The method reduces a time for DF determination and loss of traffic for the CE device. The method determines whether a number of active links from the network device to the CE device is greater than an active link minimum. The method also determines that the network device is the DF in response to determining that the number of active links is greater than the active link minimum.

16 Claims, 8 Drawing Sheets

(56) References Cited

U.S. PATENT DOCUMENTS

| | | | |
|---|---|---|---|
| 2013/0170340 A1* | 7/2013 | Boggala | H04L 41/0663 370/228 |
| 2014/0198636 A1* | 7/2014 | Thayalan | H04L 47/41 370/228 |
| 2014/0204729 A1* | 7/2014 | Zhang | H04L 45/245 370/218 |
| 2014/0294004 A1* | 10/2014 | Balus | H04L 12/4641 370/390 |
| 2014/0369186 A1 | 12/2014 | Ernstrom et al. | |
| 2015/0271104 A1* | 9/2015 | Chikkamath | H04L 12/4633 370/401 |
| 2015/0312088 A1* | 10/2015 | Ramakrishnan | H04L 41/0654 370/218 |
| 2016/0234100 A1* | 8/2016 | Pathangi Narasimhan | H04L 41/12 |
| 2017/0063600 A1* | 3/2017 | Singh | H04L 12/18 |

* cited by examiner

DESIGNATED FORWARDER (DF) ELECTION AND RE-ELECTION ON PROVIDER EDGE (PE) FAILURE IN ALL-ACTIVE REDUNDANCY TOPOLOGY

FIELD

Embodiments of the invention relate to the field of Ethernet virtual private networks (EVPNs), and more specifically, to the process of electing designated forwarders (DFs) between customer edge (CE) devices and provider edge (PE) devices.

BACKGROUND

An Ethernet virtual private network (EVPN) instance is a virtual network encompassing a set of customer edge devices (CEs) that are connected to provider edge devices (PEs), where the PEs are the edge of a provider network that utilizes a multi-protocol label switching (MPLS) infrastructure. The PEs provide virtual layer 2 bridged connectivity between CEs. In a given provider network there may be multiple EVPN instances. CEs may be hosts, routers, switches or similar devices. PEs may be routers or similar devices.

The infrastructure utilizes media access control (MAC) addresses for routing and multiprotocol border gateway protocol (BGP) over the MPLS/virtual extensible local area network (VxLAN) core for determining the topology of the network. PEs advertise the MAC addresses learned from the CEs that are connected to them, along with an MPLS label to other PEs in the control plane using BGP. Control-plane learning offers greater control over the MAC learning process, such as restricting which devices learn specific information and the ability to apply policies. This enables load balancing of traffic to and from CEs that are multi-homed to multiple PEs. It also improves convergence times in the event of certain network failures.

A CE that is a host or a router that is multi-homed directly to more than one PE in an EVPN instance on a given Ethernet segment may have one or more Ethernet tags configured on the Ethernet segment. However, only one of the PEs, referred to as a designated forwarder (DF), is responsible for sending broadcast, unknown unicast and multicast (BUM) traffic to this CE. An Ethernet segment is a collection of Ethernet links that connect a customer site to a provider network. A procedure for electing a DF is set forth in the Internet Engineering Task Force (IETF) request for comments (RFC) 7432, entitled "BGP MPLS-Based Ethernet VPN."

In one embodiment, the process of electing the DF may occur when a PE discovers the Ethernet segment identifier (ESI) of the attached Ethernet segment. The PE advertises an Ethernet Segment route with the associated ES-Import extended community attribute. The PE then starts a timer (default value=3 seconds) to allow the reception of Ethernet Segment routes from other PEs connected to the same Ethernet segment. This timer value should be the same across all PEs connected to the same Ethernet segment. When the timer expires, each PE builds an ordered list of the IP addresses of all the PEs connected to the Ethernet segment (including itself), in increasing numeric value. Each IP address in this list is extracted from the "Originating Router's IP address" field of an advertised Ethernet Segment route. Every PE is then given an ordinal indicating its position in the ordered list, starting with 0 as the ordinal for the PE with the numerically lowest IP address. The ordinals are used to determine which PE will be the DF for a given EVPN instance on the Ethernet segment, using a rule. The rule assumes a redundancy group of N PEs, for VLAN-based service, where the PE with ordinal i is the DF for an <ES, VLAN V> when (V mod N)=i. In the case of VLAN-(aware) bundle service, then the numerically lowest VLAN value in that bundle on that ES MUST be used in the modulo function.

Using the "Originating Router's IP address" field in the ES route to get the PE IP address needed for the ordered lists allows for a CE to be multi-homed across different autonomous systems (ASes) if such a need ever arises. The PE that is elected as a DF for a given <ES, VLAN> or <ES, VLAN bundle> will unblock multi-destination traffic for that VLAN or VLAN bundle on the corresponding Ethernet Segment. The DF PE unblocks multi-destination traffic in the egress direction towards the segment. All non-DF PEs continue to drop multi-destination traffic in the egress direction towards that <ES, VLAN> or <ES, VLAN bundle>. In the case of link or port failure, the affected PE withdraws its Ethernet Segment route. This will re-trigger the service carving procedures on all the PEs in the redundancy group. For PE node failure or upon PE commissioning or decommissioning, the PEs re-trigger the service carving.

SUMMARY

In one embodiment, a method is provided that implements by a network device functioning as a provider edge (PE) device to determine a designated forwarder (DF) for sending broadcast, unknown unicast or multicast (BUM) traffic to a customer edge (CE) device, which is connected to a plurality of PE devices in an Ethernet virtual private network (EVPN) instance on a given Ethernet segment. The method reduces a time for DF determination and loss of traffic for the CE device. The method includes determining whether a number of active links from the network device to the CE device is greater than an active link minimum, and determining that the network device is the DF in response to determining that the number of active links is greater than the active link minimum, where the CE device prioritizes link activation such that only a single PE device in the plurality of PE devices has a number of active links that is greater than the active link minimum.

In another embodiment, a method is implemented by a network device functioning as a CE device to facilitate determination of a DF for sending broadcast, BUM traffic from a plurality of PE devices in an EVPN instance on a given Ethernet segment. The method reduces a time for DF determination and loss of traffic for the CE device. The method includes determining a set of priorities for links between the network device and the plurality of PE devices, where each PE device in the plurality of PE devices has one active link to the network device with a highest priority, and remaining links to the network device have decreasing priority without overlap between the PE devices in the plurality of PE devices. The method also includes determining an active link minimum based on a total number of links to be active in the Ethernet segment, and reassigning active links between the network device and the PE devices according to the set of priorities for the links thereby identifying a new DF, in response to a change in connection of PE devices to the Ethernet segment.

In a further embodiment, a network device functions as a PE device to implement a method to determine a DF for sending BUM traffic to a CE device, which is connected to a plurality of PE devices in an EVPN instance on a given Ethernet segment. The method reduces a time for DF determination and loss of traffic for the CE device. The network device includes a non-transitory machine-readable medium having stored therein a DF election module, and a processor coupled to the non-transitory machine-readable medium. The processor is configured to execute the DF election module. The DF election module determines whether a number of active links from the network device to the CE device is greater than an active link minimum, and determines that the network device is the DF in response to determining that the number of active links is greater than the active link minimum, where the CE device prioritizes link activation such that only a single PE device in the plurality of PE devices has a number of active links that is greater than the active link minimum.

In another embodiment, a network device functions as the CE device to implement a method to facilitate determination of a DF for sending BUM traffic from a plurality of PE devices in an EVPN instance on a given Ethernet segment. The method reduces a time for DF determination and loss of traffic for the CE device. The network device including a non-transitory machine-readable medium having stored therein a DF election module, and a processor coupled to the non-transitory machine-readable medium. The processor is configured to execute the DF election module. The DF election module determines a set of priorities for links between the network device and the plurality of PE devices. Each PE device in the plurality of PE devices has one active link to the network device with a highest priority, and remaining links to the network device have decreasing priority without overlap between the PE devices in the plurality of PE devices. The DF election module determines an active link minimum based on a total number of links to be active in the Ethernet segment, and reassigns active links between the network device and the PE devices according to the set of priorities for the links thereby identifying a new DF, in response to a change in connection of PE devices to the Ethernet segment.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
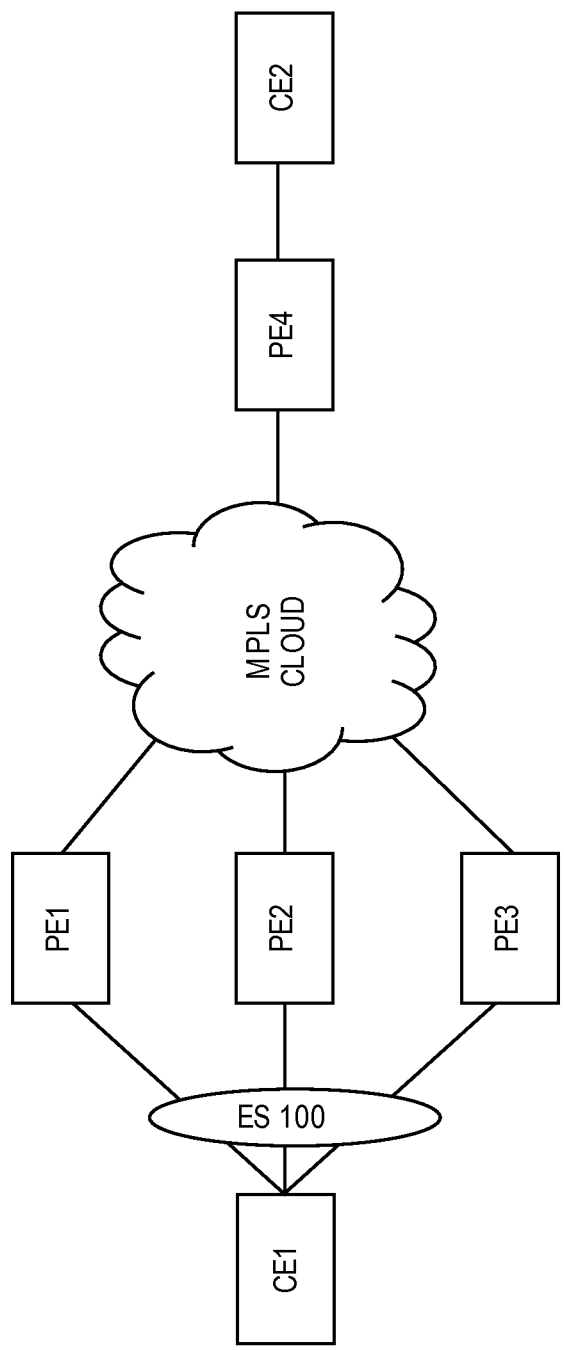
FIG. 1 is a diagram of one embodiment of an Ethernet virtual private network (EVPN).

The following description describes methods and apparatus for election of a provider edge device (PE) to serve as a designated forwarder in an Ethernet virtual private network (EVPN) that provides a process that is fast and efficient. The process can be utilized for the election and re-election on PE failure in all-active redundancy topology. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

IETF RFC 7432 describes border gateway protocol (BGP) multi-protocol label switching (MPLS)-Based Ethernet virtual private network (EVPN) operation and structures. An EVPN is an enhanced Layer-2 service that emulates an Ethernet (virtual) local area network (LAN) across a packet switched network (PSN). EVPN supports load-sharing across multiple connections from a Layer-2 site to an L2VPN service. An EVPN virtual local area network (VLAN) is a VLAN that follows BGP EVPN procedures. EVPNs are instanced and referred to as EVPN instances. An EVPN instance (EVI) spans PEs participating in that EVPN. It can span multiple broadcast domains. Another definition for an EVI is 'a collection of EVPN VLANs.'

An EVPN comprises a set of provider edge devices (PEs) connected with a set of customer edge devices (CEs) over an Ethernet Segment. An Ethernet Segment (ES) refers to a set of Ethernet links connecting a CE to one or more PEs. An Ethernet Segment Identifier (ESI) refers to a unique non-zero identifier that identifies an Ethernet segment. An EVPN link is an Ethernet link on which EVPN service is provided and is bound to a bridge associating it with one or more EVPN VLANs. A signaled EVPN link is a multi-homed EVPN Link that has a CE side signaling and determining the active/standby links. Examples of signaled EVPN links are pseudowires or links that are managed by a link aggregation control protocol (LACP) as part of a link aggregation group (LAG).

When only a single PE, among all the PEs attached to an Ethernet segment, is allowed to forward traffic to/from that Ethernet segment for a given VLAN, then the Ethernet segment is defined to be operating in Single-Active redundancy mode. In contrast, when all PEs attached to an Ethernet segment are allowed to forward known unicast traffic to/from that Ethernet segment for a given VLAN, then the Ethernet segment is defined to be operating in All-Active redundancy mode. In some embodiments, an MPLS label can be used to identify an Ethernet segment of origin for data traffic, which can be referred to as a split horizon label.

As mentioned, an EVPN includes a set of CEs connected to a set of PEs, where when a given CE is homed (in communication with as part of an EVI) by more than one PE, then this CE is referred to as a multi-homed device (MHD). However, when a given CE is homed only by a single PE, then the CE is considered a single-homed device (SHD). A PE which learns media access control (MAC) addresses from a SHD and advertises MAC/Internet Protocol (IP) routes to other PEs is referred to as a primary PE. A MAC/IP route is a route carrying a host MAC and possibly IP address around with it. Processes related to route discovery include Ethernet Auto Discovery routes per Ethernet Segment (Ethernet A-D per ES) and Ethernet Auto Discovery routes per EVPN instance (Ethernet A-D per EVI).

In the EVPN infrastructure various labels are utilized with the data traffic, including an alias label and EVPN label. An alias label is a label used to 'alias' an EVI/ESP<VLAN> carried in an Ethernet A-D per EVI. An EVPN label is a label carried on the MAC/IP route.

The embodiments described herein below, provide a method and system operating in the environment and with the infrastructure described above. The method and system elect a designated forwarder (DF), and upon failure of a PE or set of PEs in the EVPN, the method and system re-elect the designated forwarder. As used herein, a DF is a PE which is responsible for sending broadcast, unknown unicast, and multicast (BUM) traffic to the CE which is connected to more than one PE in an EVPN instance on a given Ethernet Segment.

FIG. 1 is a diagram of one embodiment of an EVPN that illustrates the infrastructure related to the embodiments. In the diagram, a CE (CE1) communicates with a set of PEs (PE1-3) over an Ethernet Segment (ES100). In this example, ES100 is operating in all-active redundancy mode where all PEs (PE1-3) attached to the ES100 are allowed to forward known unicast traffic to/from ES100 for a given VLAN to CE1. In other words, CE1 is multi-homed to PE1, PE2 and PE3. The PEs1-3 connect the CE1 to a provider MPLS network that enables the CE1 to reach remote devices such as CE2 via PE4. PE4 is a remote PE, relative to CE1, and CE2 is single-homed to PE4.

The embodiments let each of the PEs determine whether they are a DF for the given ES as soon as their links that are part of the ES become active, so that they can start forwarding BUM traffic towards the CEs that they communicate with. This minimizes the loss or 'black-holing' of BUM traffic when a DF election takes more time causing the BUM traffic to be dropped due to a lack of a DF to enable the BUM traffic to reach the CE. According to the existing techniques, when the DF (e.g., PE1) fails, it takes a certain amount of time for the other PEs (e.g., PE2, PE3) that also service a CE (e.g., CE1) on an ES (e.g., ES100) to detect the DF failure and to elect the new DF. Any BUM traffic that is in transit towards CE1 is lost or 'black-holed' until a new DF is elected. The methods of the embodiments enable other PEs on the ES to detect and take action immediately (e.g., without delay) whenever a PE is detached from the ES either because of node (i.e., PE) failure or PE link to ES failure.

The embodiments ensure a PE with a greater number of active links with a CE will be elected to be the DF for that CE, because electing that PE to be the DF is most efficient for the ES. The DF is the only PE which is responsible for forwarding BUM traffic towards the CE, along with any unicast traffic destined to the PE, thus, utilizing the PE with the most links to the CE will ensure that the heavier traffic from the DF in comparison to the traffic from the other PEs will be handled as quickly as possible. The embodiments also provide a method of electing the DF that ensures there is not a 'split-brain' situation or similar situation where more than one PE assumes that it has been elected to be the DF for the given ES, which would result in undesirable duplicate BUM traffic being forwarded towards the CE. Overall, the embodiments provide a process that is nearly instantaneous and not complex in electing a DF.

In contrast to the embodiments presented herein below, existing techniques have a number of drawbacks. The conventional process for electing a DF in this environment is not instantaneous (i.e., requiring some time, e.g., less than a second, to resolve). The conventional process requires all the PEs to start a timer (i.e., a default timer set to 3 seconds), before electing the DF, which effectively results in dropping BUM traffic towards the CE until the timer expires. The conventional process also allows scenarios with a split-brain or similar situation to occur where more than one PE determines that it is the DF for a given CE, which effectively results in sending duplicate BUM traffic towards the CE. This could be the case, when more than one PE is connected to the ES, where each of the PEs is not aware of all of the other PEs or the PEs loose neighbor relation information between them.

When the PE that is functioning as DF fails in the conventional process, it takes a while for other PEs on the same ES to detect the failure and re-elect the new DF, and this process gets more complicated when each of the other PEs detects the failure at a different point of time. This scenario effectively results in loss of or 'black-holing' of the BUM traffic towards the CE until a new DF is elected. The conventional process does not take into consideration the capacity of the links between a given PE and the CE in the DF election process, which may result in electing a PE that has a fewer number of links than the number of links of other available PEs and/or where the links of the elected PE provide less bandwidth and capacity towards the CE than the links of other available PEs. The conventional process for DF election also does not take into consideration the status (example: active/standby) of links between a given PE and the CE in the DF election, which may result in electing a PE to be the DF where the elected PE has one or more links to the CE that are in a standby status and thus unavailable to transfer data. This effectively results in loss of or 'black-holing' of BUM traffic towards the CE. The conventional process also results in electing a new DF for a given ES every time a PE is attached or detached from an ES. The conventional process requires an exchange of messages (ES routes) between each of the PEs and a calculation at each of the PEs to elect a DF. Thus, there is significant computational and bandwidth overhead associated with the conventional process that the embodiments herein improve upon by reducing this overhead and resolving DF election faster. Accordingly, the embodiments herein provide a process and infrastructure that avoids these issues with the conventional implementations.

The embodiments overcome these limitations in the existing techniques by introducing the idea of using a 'number of active links on a PE' to elect the DF. Each of the PEs servicing a multi-homed CE would run an algorithm to decide whether it is the DF each time that a DF election is needed.

This embodiment can be expressed in pseudocode as:

```
if (number_of_active_links > N) then
{
PE is DF.
} else {
PE is not DF (or stop being DF).
}
```

The example embodiment described herein provides a solution for N=1 and one of ordinary skill in the art would understand that the principles can be extended to scenarios where N=2, 3, 4, etc. However, if N=0, it is a special case of 'single-active' redundancy, in which case a PE which has any link that is active will become DF.

The embodiments provide a method in which the CE would activate the links in such a way that only one PE among all the PEs connected to the ES will have more links active than any other PEs. The embodiments make use of standard link aggregation control protocol (LACP) parameter configuration on the CE to achieve this.

As mentioned above, the embodiments provide a process that relies on the number of links between the CE and each PE, specifically the number of active links. The process of the embodiments determines that the number of links between the CE and each PE available to be the DF to be at the least the total number of PEs on the ES+1. In other words, there is assumed to be at least one link for each PE with the addition of at least one more link for one of the PEs. For example, if the CE is multi-homed to 3 PEs (as illustrated in FIG. 1), then the number of links between the CE and PE would be at least 4. This stipulation provides that each PE has enough bandwidth to carry traffic to/from the CE when all other PEs are down. In other embodiments, variations where there is not sufficient bandwidth to handle all of the traffic are encompassed.

In addition to making a determination of the number of links, the process determines the number of active links. The process of the embodiments determines that the 'maximum number of active links' configuration should be set to the total number of PEs on the ES+1. For example, if CE is multi-homed to 3 PEs, then the maximum number of active links may be configured to be a value of 4 active links between the 3 PEs and the CE.

In the process of the embodiments, the 'LACP system priority' configuration on the CE may have a lower number (i.e., a higher priority) than any of the nodes (PEs) on a given ES. The LAG encompassing the links between the CE and set of PEs is across multiple nodes, and the head end (i.e., the CE in this case) will have the higher system priority (i.e., a lower number) than the other nodes (i.e., the PEs in this case), so that the CE can override the other nodes (PEs) in determining active and standby links.

The ports of the LAG between the CE and set of PEs have a specific port priority scheme. Where the LAG is across multiple nodes (PEs) and the CE is responsible, because of higher system priority, for determining active and standby links, the links with the CE will be configured with LACP priority in such a way that the links are uniformly distributed across the PEs except for the additional active link for one of the PEs. The embodiment utilizes the following pattern for priority so that only one PE will have more than one link active. Each PE should have only one link with a highest priority. This highest priority value should be the same value (e.g., 1) on all the PEs. In this way the CE will activate at least one link to each PE to be part of the LAG, as these links have the same priority. The priority of the rest of the links to PEs should be decreasing in priority (e.g., in increasing consecutive order 2, 3, 4, etc. when the highest priority value is 1) starting with the first PE and ending with the last PE. For example, the following table indicates port priority assigned to links at the CE for each of the links to PEs where each PE is connected via four links to the CE.

TABLE I

| | CE | |
|---|---|---|
| Link | Port Priority | Description |
| Link 1 | 1 | to PE1 |
| Link 2 | 2 | to PE1 |
| Link 3 | 3 | to PE1 |
| Link 4 | 4 | to PE1 |
| Link 5 | 1 | to PE2 |
| Link 6 | 5 | to PE2 |
| Link 7 | 6 | to PE2 |
| Link 8 | 7 | to PE2 |
| Link 9 | 1 | to PE3 |
| Link 10 | 8 | to PE3 |
| Link 11 | 9 | to PE3 |
| Link 12 | 10 | to PE3 |

The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 2:
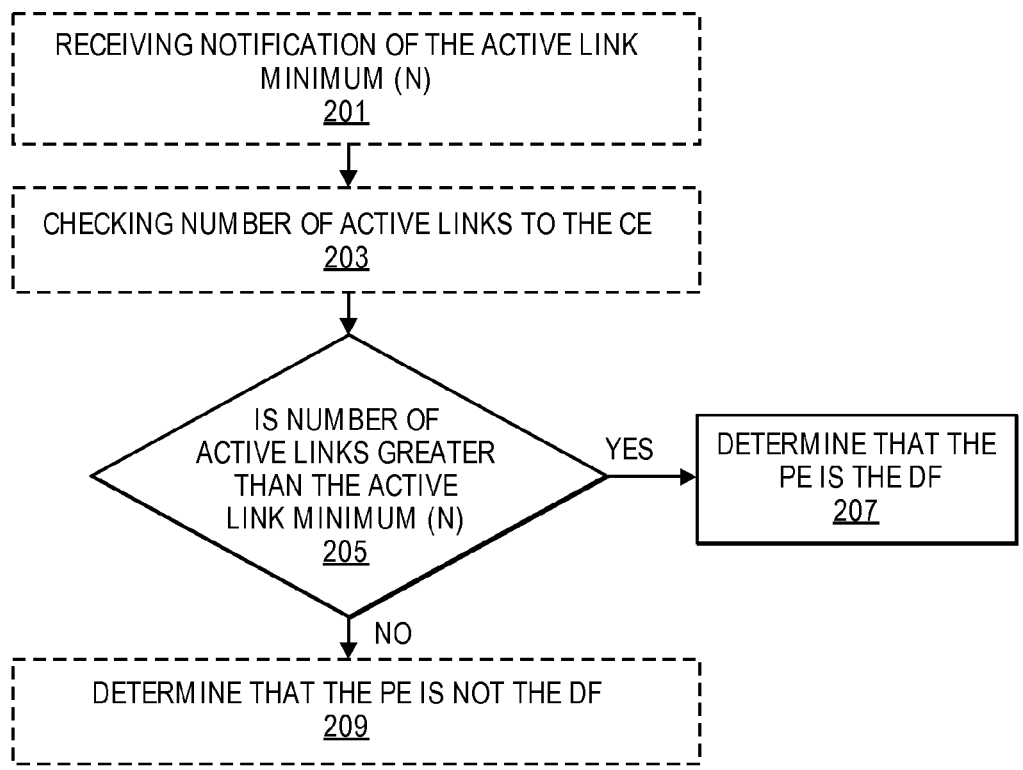
FIG. 2 is a diagram of one embodiment of a process for the operation of a PE in electing a DF.

FIG. 2 is a diagram of one embodiment of a process for the operation of a PE in electing a DF. This process is implemented at each PE and is triggered whenever a DF election is needed. For example, the DF election may take place in response to a change in connection of PEs to the ES, e.g., when the current PE that is the DF fails, when a PE is added to or dropped from the ES or under similar circumstances. The process starts with the PE receiving notification of the active link minimum (N) (Block 201). This information can be provided by the CE or similar entity. The CE can provide the active link minimum (N) via LACP or similar protocol for data exchange. In other embodiments, the active link minimum can be configured by an administrator or similarly distributed. The active link minimum can be updated if the topology of the EVPN is changed or under similar circumstances.

Once the active link minimum (N) is known to a PE, the PE can monitor the number of active links between it and the CE (Block 203). If the number of active links changes, then a determination is made whether the number of active links exceeds the active link minimum (N) (Block 205). If the PE determines that the number of active links exceeds the active link minimum then the PE determines that it is to be the designated forwarder (DF) (Block 207). However, if the PE determines that the number of active links does not exceed (i.e., is less than or equal to) the active link minimum, then the PE determines that it is not the DF for the CE (Block 209). In some embodiments, the check is made whether the number of active links is equal to or greater than the active link minimum.

Figure 3:
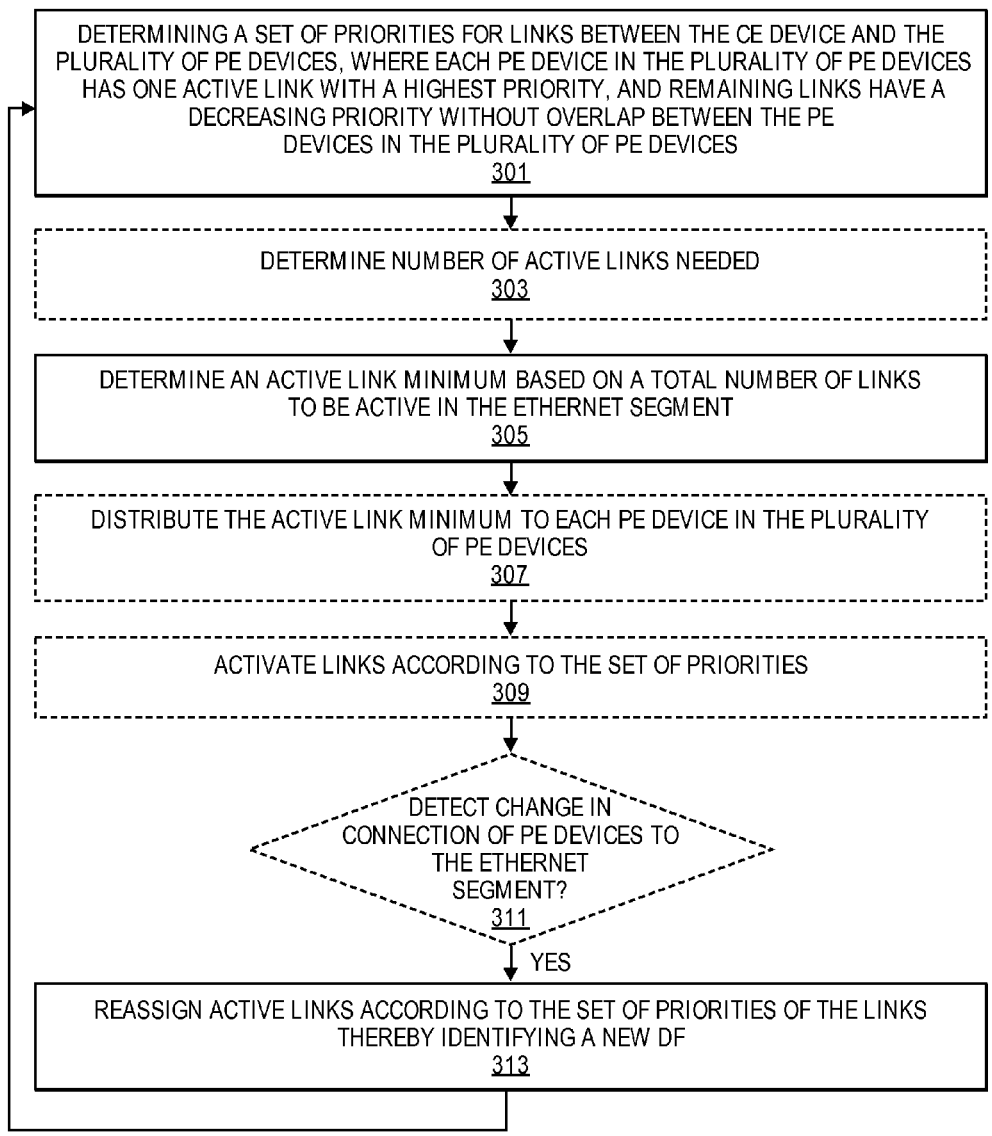
FIG. 3 is a diagram of one embodiment of a process for the operation of a CE in electing a DF.

FIG. 3 is a diagram of one embodiment of a process for the operation of a CE in electing a DF. The CE plays the primary role in electing the DF from the set of PEs in the EVPN that are sending it traffic, in particular BUM traffic. The process begins with the CE determining a set of priorities for the links between the CE device and the set of PE devices connected to the CE device (Block 301). Each PE device in the set of PE devices connected to the CE device has one active link with a highest priority. The remaining links have decreasing priority (e.g., an increasing consecutive order of priority 2, 3, 4, etc. when the highest priority value is 1) without overlap between the links of the set of PE devices, as illustrated above in TABLE I.

A determination is made as to the number of active links needed (Block 303). The number of active links can be at least the number of connected PEs in the ES. In other embodiments the number of active links can be any number that is determined by estimation or tracking of the status of the links of the ES. Similarly, the minimum number of active links is determined based on the total number of active links and/or the total number of PEs connected with the CE via the ES (Block 305). The minimum number of active links needed can be based on estimation or any specific formula. In one embodiment, the minimum number of active links is equal to the number of connected PEs for the CE in the EVPN, plus one active link. This set up ensures that one PE has one more active link than the other PEs thereby indicating to the PE that has the one more active link that it is the DF for the CE. In other embodiments, other processes may be used for determining the minimum number of active links where the minimum is a multiple of the number of PEs or similar modification where it is the addition of one or more active links that indicates the designated DF.

The CE then distributes the active link minimum to each of the PE devices connected with it in the EVPN (Block 307). This information can be distributed via LACP or similar protocol to each of the PEs. The CE then activates and prioritizes the links with the connected PEs (Block 309). This process can be done at initialization, in response to a change in connection of PEs (e.g., due to a new connection or disconnection of a PE, a failure of a link or PE), or under a similar circumstance. In response to a change in connection of PEs (Block 311), then the active links are reassigned according to the set of priorities of the links thereby identifying a new DF (Block 313). In some cases the process may be re-executed to determine a new set of priorities and DF in response to the change in the set of PEs. However, the initial reassignment immediately re-elects a DF and the complete reanalysis can converge over a longer time without loss of BUM traffic.

Figure 4:
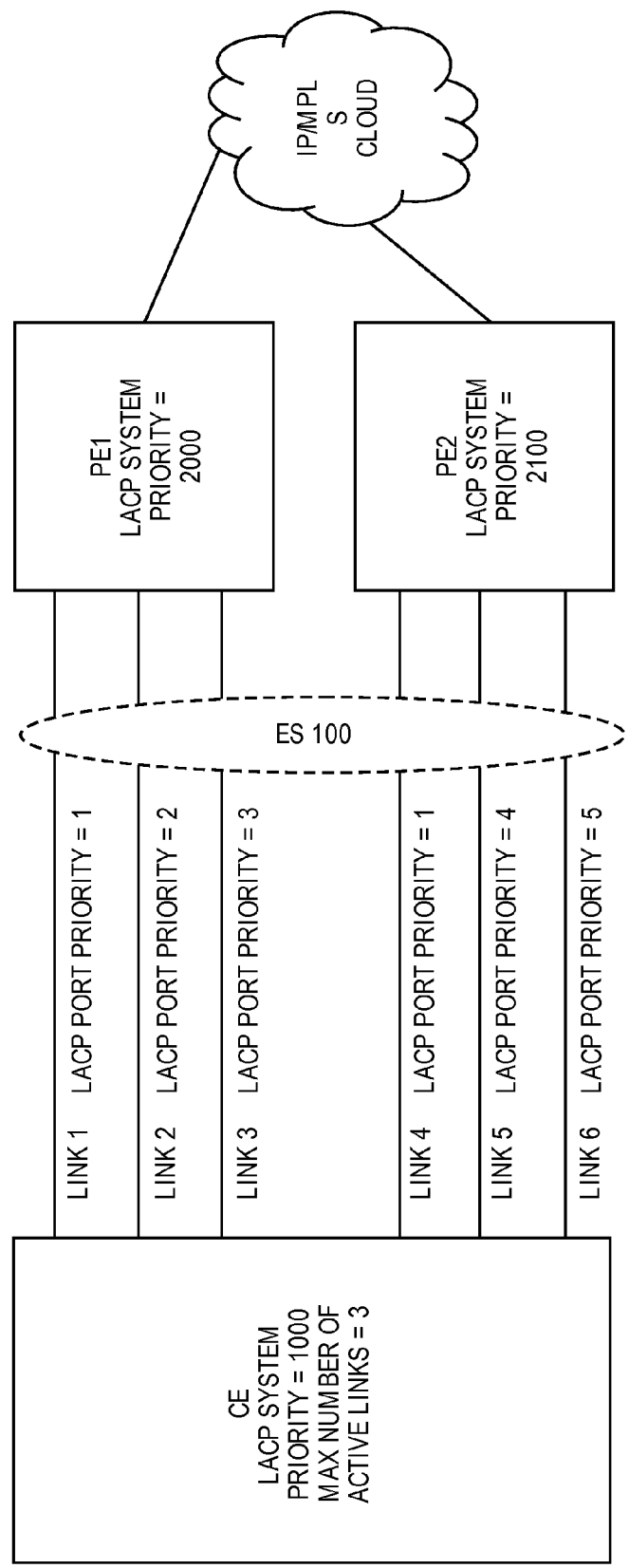
FIG. 4 is a diagram of one embodiment of an Ethernet Segment in the EVPN.
Figure 5:
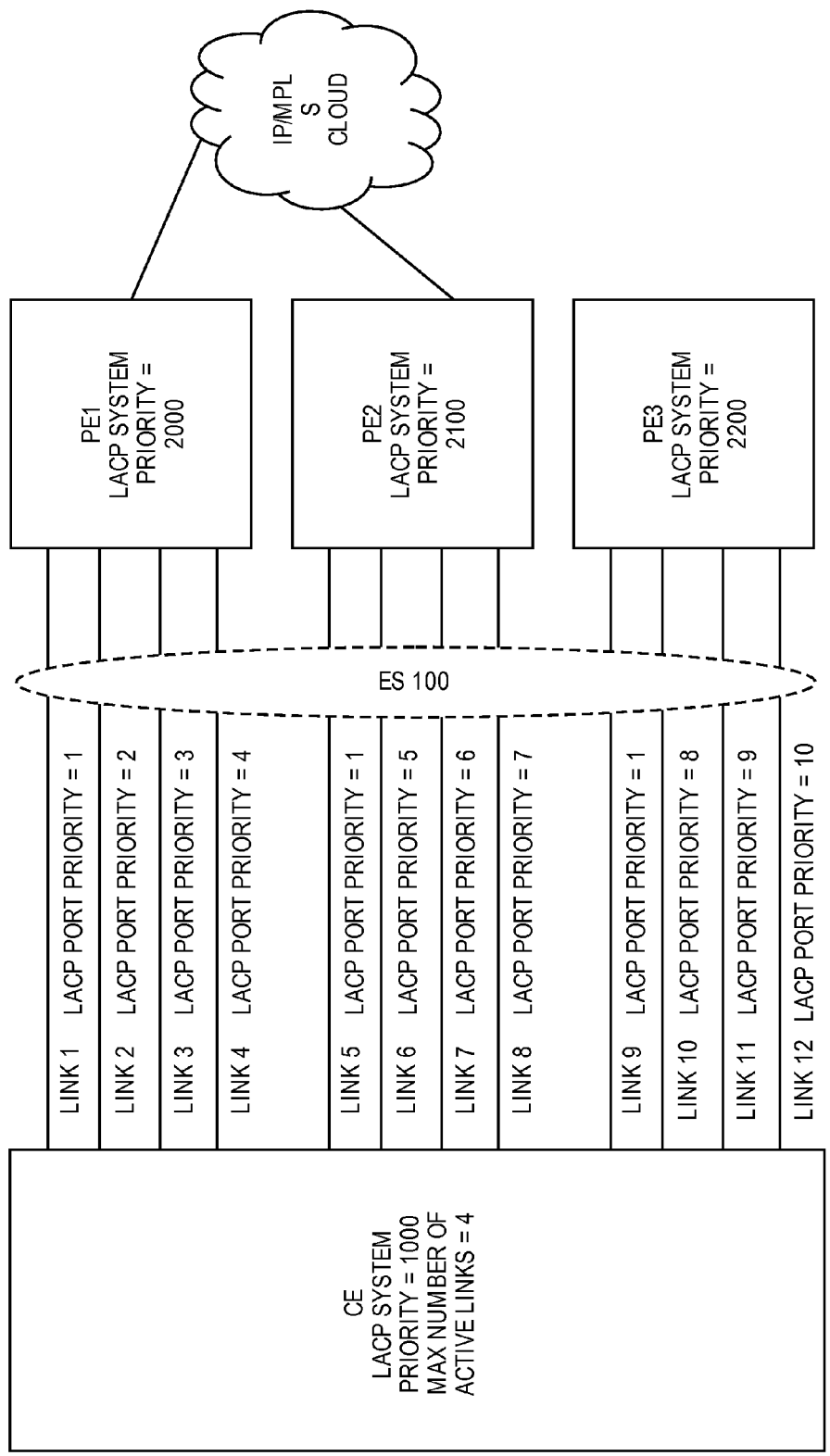
FIG. 5 is a diagram of another embodiment of an Ethernet Segment in the EVPN.

FIG. 4 is a diagram of one embodiment of an Ethernet Segment in the EVPN. This diagram is provided to illustrate an example application of the DF election process. The example of electing a DF is described in relation to the simplified architecture of FIG. 4 for sake of illustration and clarity and not limitation. Thus, the process is described to elect a DF when there are a maximum of 2 PEs on a given ES in this example. FIG. 5 below provides a further example when there are a maximum of 3 PEs on a given ES. One skilled in the art would understand that the process can be extended to any number of PEs on a given ES.

In FIG. 4, ES100 is an Ethernet Segment operating in All-Active redundancy mode. The CE is multi-homed to PE1 and PE2. The CE makes use of LACP to aggregate links from PE1 and PE2. In this example, the PE1 has 3 links with the CE that are part of ES100. PE2 has 3 links with the CE that are part of ES100. The configuration of PE1 sets its LACP System Priority to 2000, which is a lower priority than the CE with LACP System Priority set to 1000. The configuration of PE2 set its LACP System Priority to 2100, which is the lowest priority relative to the CE.

In this example embodiment, the configuration on the CE includes LACP System priority being 1000, which gives the CE the highest priority compared to the other nodes (i.e., PEs) allowing the CE to control which links are active. The CE determines the maximum number of active links to be 3, the minimum active links in the LAG to be 2, and the LACP port priorities are set as set forth in Table II.

TABLE II

| Link | LACP Port Priority | Description |
|---|---|---|
| Link 1 | 1 | to PE1 |
| Link 2 | 2 | to PE1 |
| Link 3 | 3 | to PE1 |
| Link 4 | 1 | to PE2 |
| Link 5 | 4 | to PE2 |
| Link 6 | 5 | to PE2 |

In this example, Link1 and Link 4 are configured with the same LACP port priority. This configuration forces the CE to activate only 3 links out of 6 links (1 from each PE, plus one additional link) available for aggregation. LACP makes use of LACP port priority of the links in selecting the active links. The links with lower values of priority (i.e., higher priority) will be preferred over links with higher values of priority (i.e., lower priority).

Using the Example of FIG. 4, a number of scenarios can demonstrate the DF election process under different conditions. In a first scenario, both PE1 and PE2 are operating normally. The status of each of the links is shown below in TABLE III.

TABLE III

Scenario 1
PE1 is UP
PE2 is UP

| Link | LACP Port Priority | Description | Status |
|---|---|---|---|
| Link 1 | 1 | to PE1 | Active |
| Link 2 | 2 | to PE1 | Active |
| Link 3 | 3 | to PE1 | Standby |
| Link 4 | 1 | to PE2 | Active |
| Link 5 | 4 | to PE2 | Standby |
| Link 6 | 5 | to PE2 | Standby |

DF: PE1
PE1 will determine that two of its links are Active and takes a role of DF.

In this example, each of the PEs has a high priority link that is active. The PE that has been elected to be the DF has a second active link (Link 2). This lets PE1 determine that it is the DF because it has a number of active links that is equal to or exceeds the minimum number of active links for this example, which is two. PE2 on the other hand determines that it is not the DF because its number of active links is below the active link minimum.

Using the Example of FIG. 4, another scenario related to DF election under different conditions is illustrated with reference to TABLE IV. In this second scenario, PE1 is operating normally and PE2 has failed. The status of each of the links is shown below in TABLE IV.

TABLE IV

Scenario 2
PE1 is UP
PE2 is DOWN

| Link | LACP Port Priority | Description | Status |
|---|---|---|---|
| Link 1 | 1 | to PE1 | Active |
| Link 2 | 2 | to PE1 | Active |
| Link 3 | 3 | to PE1 | Active |
| Link 4 | 1 | to PE2 | DOWN |
| Link 5 | 4 | to PE2 | DOWN |
| Link 6 | 5 | to PE2 | DOWN |

DF: PE1
PE1 will determine that three of its links are Active and takes a role of DF.

In this scenario, the PE2 is down. The minimum number of active links is 2, thus, after the CE reassigns the active links according to the LACP port priority of the remaining links in response to the failure of PE2, the DF election criteria is affected. As a result, all of the PE1 links are active. In this case PE1 was already the DF and now remains the DF.

Continuing to use the example of FIG. 4, another scenario related to DF election under different conditions is illustrated with reference to TABLE V. In this third scenario, PE2 is operating normally and PE1 has failed. The status of each of the links is shown below in TABLE V.

TABLE V

Scenario 3
PE1 is DOWN
PE2 is UP

| Link | LACP Port Priority | Description | Status |
|---|---|---|---|
| Link 1 | 1 | to PE1 | DOWN |
| Link 2 | 2 | to PE1 | DOWN |
| Link 3 | 3 | to PE1 | DOWN |
| Link 4 | 1 | to PE2 | Active |
| Link 5 | 4 | to PE2 | Active |
| Link 6 | 5 | to PE2 | Active |

DF: PE2
PE2 will determine that three of its links are Active and takes a role of DF.

In this scenario, the PE1 is down. The minimum number of active links is 2, thus, after the CE reassigns the active links according to the LACP port priority of the remaining links in response to the failure of PE1, the DF election is affected. As a result, all of the PE2 links are active, which signals to PE2 that it is now the DF, because it has 3 active links, which exceeds the active link minimum.

FIG. 5 is a diagram of another embodiment of an Ethernet Segment in the EVPN. ES100 is an Ethernet Segment operating in All-Active redundancy mode. The CE is multi-homed to PE1, PE2 and PE3. The CE makes use of LACP to aggregate links from PE1, PE2 and PE3. In this example, the PE1 has 4 links towards the CE that are part of ES100. PE2 has 4 links towards the CE that are part of ES100. PE3 also has 4 links towards the CE that are part of ES100. The configuration of PE1 sets its LACP System Priority to 2000, which is a lower priority than the CE with LACP System Priority set to 1000. The configuration of PE2 set its LACP System Priority to 2100, which is a lower priority than the CE. Similarly, the configuration of PE3 set its LACP System Priority to 2200, which is the lowest priority relative to the CE.

In this example embodiment, the configuration on CE includes LACP System priority being 1000, which gives the CE the highest priority compared to the other nodes (i.e., PEs) allowing the CE to control which links are active. The CE determines the maximum number of active links to be 4, the minimum active links in the LAG to be 2, and the LACP port priorities are set as set forth in Table VI.

TABLE VI

| Link | Port Priority | Description |
|---|---|---|
| Link 1 | 1 | to PE1 |
| Link 2 | 2 | to PE1 |
| Link 3 | 3 | to PE1 |
| Link 4 | 4 | to PE1 |
| Link 5 | 1 | to PE2 |
| Link 6 | 5 | to PE2 |
| Link 7 | 6 | to PE2 |
| Link 8 | 7 | to PE2 |
| Link 9 | 1 | to PE3 |
| Link 10 | 8 | to PE3 |
| Link 11 | 9 | to PE3 |
| Link 12 | 10 | to PE3 |

In this example, Link 1, Link 5 and Link 9 are configured with the same LACP port priority. This configuration forces the CE to activate only 4 links out of 12 links (1 from each PE, plus one additional link) available for aggregation. LACP makes use of LACP port priority of the links in selecting the active links. The links with lower values of priority (i.e., higher priority) will be preferred over links with higher values of priority (i.e., lower priority).

Using the Example of FIG. 5, a number of scenarios can demonstrate the DF election under different conditions. In a first scenario, PE1, PE2 and PE3 are operating normally. The status of each of the links is shown below in TABLE VII.

TABLE VII

Scenario 1
PE1 is UP
PE2 is UP
PE3 is UP

| Link | LACP Port Priority | Description | Status |
|---|---|---|---|
| Link 1 | 1 | to PE1 | Active |
| Link 2 | 2 | to PE1 | Active |
| Link 3 | 3 | to PE1 | Standby |
| Link 4 | 4 | to PE1 | Standby |
| Link 5 | 1 | to PE2 | Active |
| Link 6 | 5 | to PE2 | Standby |
| Link 7 | 6 | to PE2 | Standby |
| Link 8 | 7 | to PE2 | Standby |
| Link 9 | 1 | to PE3 | Active |
| Link 10 | 8 | to PE3 | Standby |
| Link 11 | 9 | to PE3 | Standby |
| Link 12 | 10 | to PE3 | Standby |

DF: PE1.
Only PE1 would determine that more than one of its links is in ACTIVE state and takes a role of DF.

In this example, each of the PEs has a high priority link that is active. The PE that has been elected to be the DF has a second active link (Link 2). This lets PE1 determine that it is the DF because it has a number of active links that is equal to or exceeds the minimum number of active links for this example, which is two. PE2 and PE3 on the other hand determine that they are not the DF because their respective number of active links is below the active link minimum.

Using the Example of FIG. 5, another scenario related to DF election under different conditions is illustrated with reference to TABLE VIII. In this second scenario, PE1 and PE2 are operating normally and PE3 has failed. The status of each of the links is shown below in TABLE VIII.

TABLE VIII

Scenario 2
PE1 is UP
PE2 is UP
PE3 is DOWN

| Link | LACP Port Priority | Description | Status |
|---|---|---|---|
| Link 1 | 1 | to PE1 | Active |
| Link 2 | 2 | to PE1 | Active |
| Link 3 | 3 | to PE1 | Active |
| Link 4 | 4 | to PE1 | Standby |
| Link 5 | 1 | to PE2 | Active |
| Link 6 | 5 | to PE2 | Standby |
| Link 7 | 6 | to PE2 | Standby |
| Link 8 | 7 | to PE2 | Standby |
| Link 9 | 1 | to PE3 | DOWN |
| Link 10 | 8 | to PE3 | DOWN |
| Link 11 | 9 | to PE3 | DOWN |
| Link 12 | 10 | to PE3 | DOWN |

DF: PE1.
Only PE1 would determine that more than one of its links is in ACTIVE state and takes a role of DF.

In this scenario, the PE3 is down. The minimum number of active links is 2, thus, after the CE reassigns the active links according to the LACP port priority of the remaining links in response to the failure of PE3, the DF election criteria is affected. As a result, three of the PE1 links are active, which exceeds the active link minimum. Thus, PE1 remains the DF in this scenario.

Continuing to use the Example of FIG. 5, another scenario related to DF election under different conditions is illustrated with reference to TABLE IX. In this third scenario, PE2 and PE3 have failed and PE1 is operating normally. The status of each of the links is shown below in TABLE IX.

TABLE IX

Scenario 3
PE1 is UP
PE2 is DOWN
PE3 is DOWN

| Link | LACP Port Priority | Description | Status |
|---|---|---|---|
| Link 1 | 1 | to PE1 | Active |
| Link 2 | 2 | to PE1 | Active |
| Link 3 | 3 | to PE1 | Active |
| Link 4 | 4 | to PE1 | Active |
| Link 5 | 1 | to PE2 | DOWN |
| Link 6 | 5 | to PE2 | DOWN |
| Link 7 | 6 | to PE2 | DOWN |
| Link 8 | 7 | to PE2 | DOWN |
| Link 9 | 1 | to PE3 | DOWN |
| Link 10 | 8 | to PE3 | DOWN |

TABLE IX-continued

Scenario 3
PE1 is UP
PE2 is DOWN
PE3 is DOWN

| Link | LACP Port Priority | Description | Status |
|---|---|---|---|
| Link 11 | 9 | to PE3 | DOWN |
| Link 12 | 10 | to PE3 | DOWN |

DF: PE1.
Only PE1 would determine that more than one of its links is in ACTIVE state and takes a role of DF.

In this scenario, the PE2 and PE3 are down. The minimum number of active links is 2, thus, after the CE reassigns the active links according to the LACP port priority of the remaining links in response to the failure of PE2 and PE3, the DF election criteria is affected. As a result, four of the PE1 links are active. Thus, PE1 remains the DF due to the number of its active links exceeding the active link minimum.

Continuing to use the Example of FIG. 5, another scenario related to DF election under different conditions is illustrated with reference to TABLE X. In this fourth scenario, PE2 and PE3 are operating normally and PE1 has failed. The status of each of the links is shown below in TABLE X.

TABLE X

Scenario 4
PE1 is DOWN
PE2 is UP
PE3 is UP

| Link | LACP Port Priority | Description | Status |
|---|---|---|---|
| Link 1 | 1 | to PE1 | DOWN |
| Link 2 | 2 | to PE1 | DOWN |
| Link 3 | 3 | to PE1 | DOWN |
| Link 4 | 4 | to PE1 | DOWN |
| Link 5 | 1 | to PE2 | Active |
| Link 6 | 5 | to PE2 | Active |
| Link 7 | 6 | to PE2 | Active |
| Link 8 | 7 | to PE2 | Standby |
| Link 9 | 1 | to PE3 | Active |
| Link 10 | 8 | to PE3 | Standby |
| Link 11 | 9 | to PE3 | Standby |
| Link 12 | 10 | to PE3 | Standby |

DF: PE2.
Only PE2 would determine that more than one of its links is in ACTIVE state and takes a role of DF.

In this scenario, the PE1 is down. The minimum number of active links is 2, thus, after the CE reassigns the active links according to the LACP port priority of the remaining links in response to the failure of PE1, the DF election is affected. As a result, three of the PE2 links are active. This causes a change in the DF election, since the number of active links for PE2 now exceeds the minimum active links.

Continuing to use the Example of FIG. 5, another scenario related to DF election under different conditions is illustrated with reference to TABLE X. In this fifth scenario, PE1 and PE2 have failed and PE3 is operating normally. The status of each of the links is shown below in TABLE XI.

TABLE XI

Scenario 5
PE1 is DOWN
PE2 is DOWN
PE3 is UP

| Link | LACP Port Priority | Description | Status |
|---|---|---|---|
| Link 1 | 1 | to PE1 | DOWN |
| Link 2 | 2 | to PE1 | DOWN |
| Link 3 | 3 | to PE1 | DOWN |
| Link 4 | 4 | to PE1 | DOWN |
| Link 5 | 1 | to PE2 | DOWN |
| Link 6 | 5 | to PE2 | DOWN |
| Link 7 | 6 | to PE2 | DOWN |
| Link 8 | 7 | to PE2 | DOWN |
| Link 9 | 1 | to PE3 | Active |
| Link 10 | 8 | to PE3 | Active |
| Link 11 | 9 | to PE3 | Active |
| Link 12 | 10 | to PE3 | Active |

DF: PE3.
Only PE3 would determine that more than one of its links is in ACTIVE state and takes a role of DF.

In this scenario, the PE1 and PE2 are down. The minimum number of active links is 2, thus, after the CE reassigns the active links according to the LACP port priority of the remaining links, the DF election criteria is affected. As a result, four of the PE3 links are active. As a result, PE3 becomes the DF because the number of active links has exceeded the minimum active link.

The embodiments described herein above provide a number of advantages over the existing techniques. The process elects DF instantaneously (e.g., without delay) by redistributing the active links based on already established priority. The moment the number of active links on a PE in a given ES is more than the minimum (or equal to the minimum or satisfies the predetermined check), the DF is determined. The process makes use of existing standard LACP procedures to distribute the active link minimum information. The process does not lead to split-brain situation at any time, as only one of the PEs that are connected to the ES will have more than the minimum number of their links active (or otherwise satisfies the predetermined check) at any given point of time. The process does not require any messages to be exchanged between peer nodes (e.g., PEs) to elect the DF and involves fast logic to elect the DF. The process ensures the PE with maximum number of active links (i.e., the PE with the most bandwidth) in a given ES is elected as DF. When the PE (which is elected as DF) node fails, the proposed procedure determines the new DF without waiting for other PEs on the ES to detect the failure. The process relies on LACP to activate links on other PEs, which is a lot faster than detecting PE node failure.

Architecture

Figure 6A:
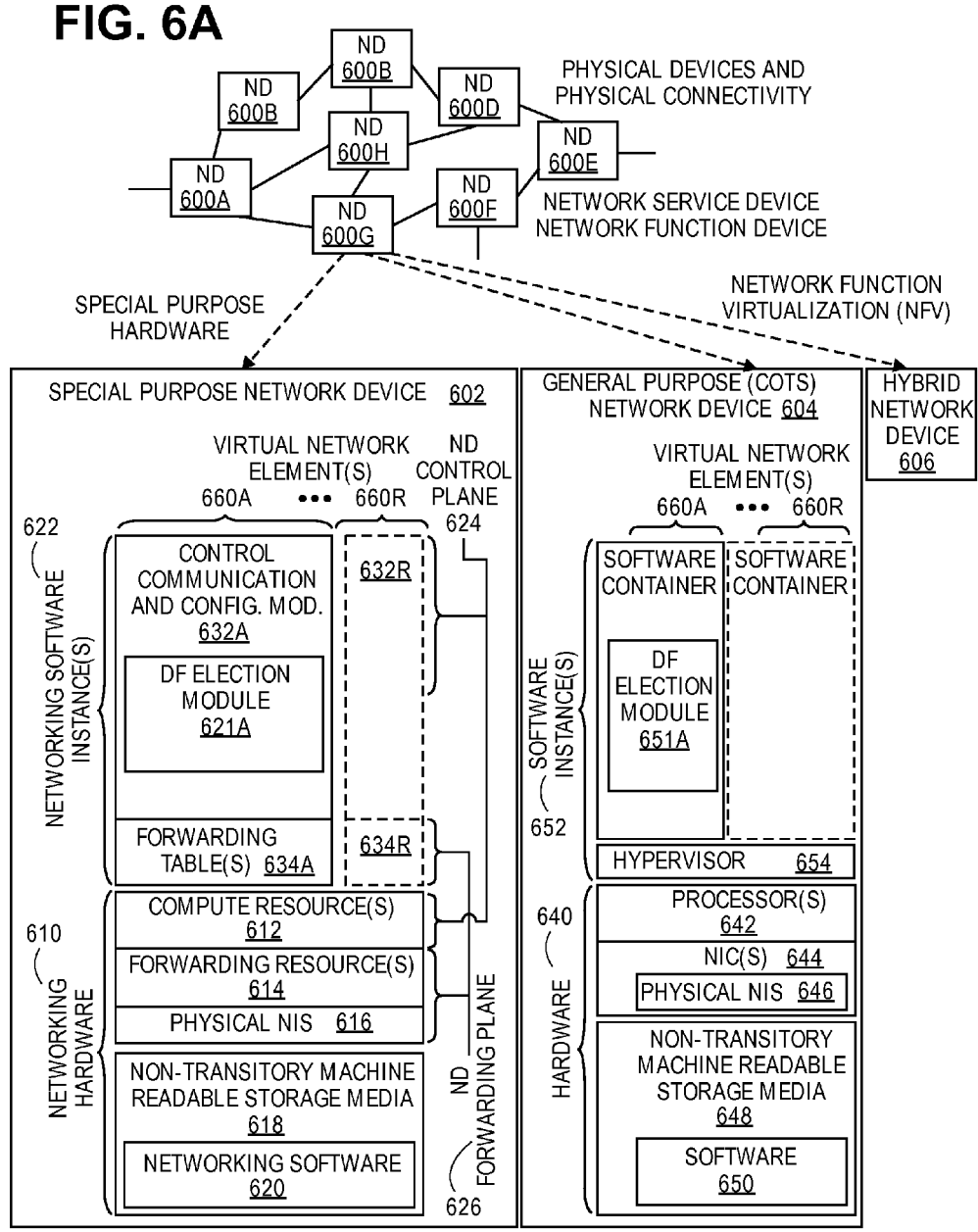
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a proprietary operating system (OS); and 2) a general purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

Software 620 can include code which when executed by networking hardware 610, causes networking hardware 610 to perform operations of one or more embodiments of the present invention as part networking software instances 622. The software 620 can include a DF election module 621A that implements the DF election process for either the CE or PE as described herein above depending on the role of the network device.

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

Figure 6B:
FIG. 6B illustrates an exemplary way to implement a special-purpose network device according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization—represented by a virtualization layer 654 and software containers 662A-R. For example, one such alternative embodiment implements operating system-level virtualization, in which case the virtualization layer 654 represents the kernel of an operating system (or a shim executing on a base operating system) that allows for the creation of multiple software containers 662A-R that may each be used to execute one of the sets of applications 664A-R. In this embodiment, the multiple software containers 662A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 654 represents a hypervisor (sometimes referred to as a virtual machine monitor (VMM)) or a hypervisor executing on top of a host operating system; and 2) the software containers 662A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 664A-R, as well as the virtualization layer 654 and software containers 662A-R if implemented, are collectively referred to as software instance(s) 652. Each set of applications 664A-R, corresponding software container 662A-R if implemented, and that part of the hardware 640 that executes them (be it hardware dedicated to that execution and/or time slices of hardware temporally shared by software containers 662A-R), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 662A-R differently. For example, while embodiments of the invention are illustrated with each software container 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 662A-R to VNEs also apply to embodiments where such a finer level of granularity is used.

In certain embodiments, the virtualization layer 654 includes a virtual switch that provides similar forwarding services as a physical Ethernet switch. Specifically, this virtual switch forwards traffic between software containers 662A-R and the NIC(s) 644, as well as optionally between the software containers 662A-R; in addition, this virtual switch may enforce network isolation between the VNEs 660A-R that by policy are not permitted to communicate with each other (e.g., by honoring virtual local area networks (VLANs)).

Software 650 can include code which when executed by processor(s) 642, cause processor(s) 642 to perform operations of one or more embodiments of the present invention as part software containers 662A-R. The software 650 can include the DF election module 651A.

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 6C:
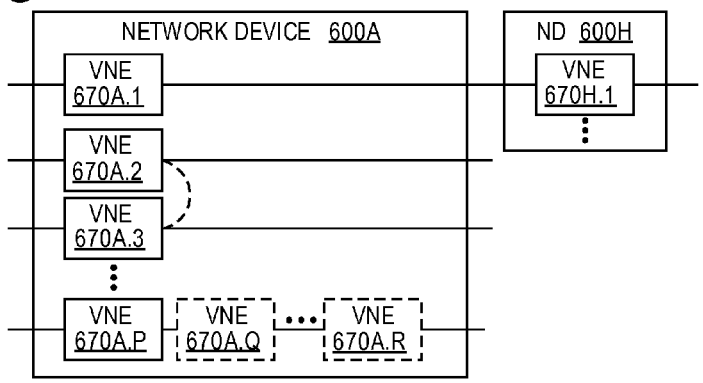
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software containers 662A-R may operate as servers; the same would be true for the hybrid network device 606; in the case of the special-purpose network device 602, one or more such servers could also be run on a virtualization layer executed by the compute resource(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 6D:
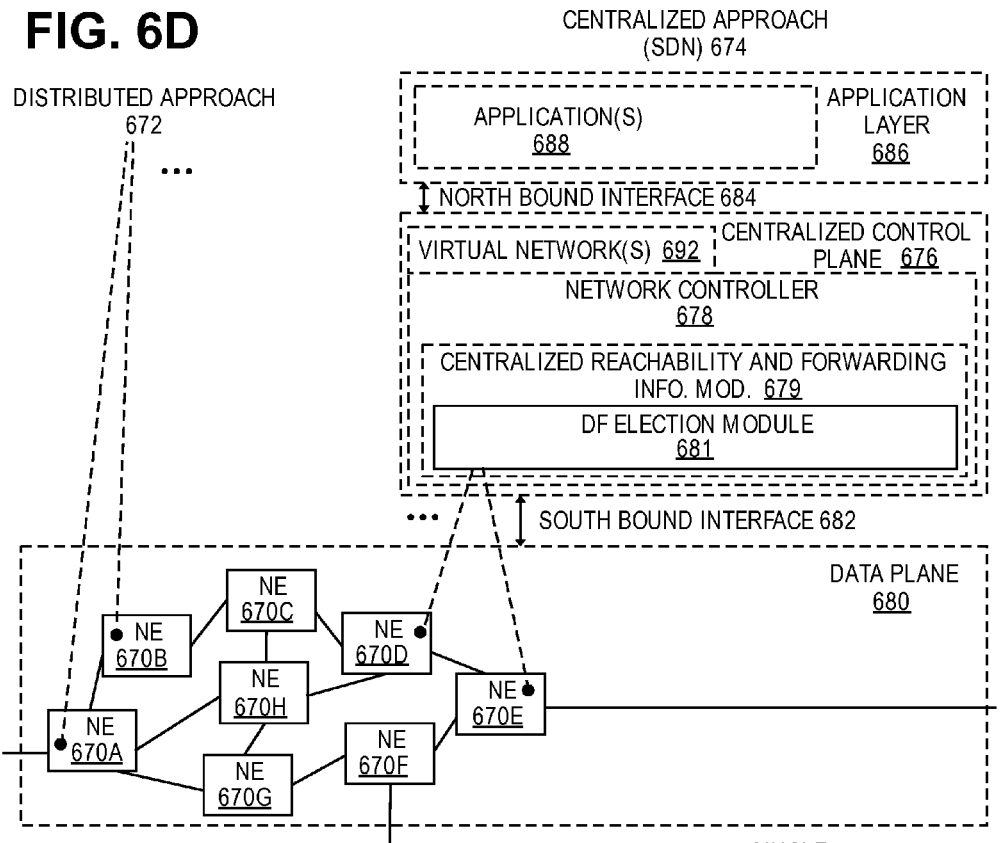
FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics. Thus, the NEs 670A-H (e.g., the compute resource(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

In some embodiments, the centralized reachability and forwarding module 679 or similar aspect of the centralized control plane 676 or the application layer 686 implements the DF election module 681, which provides the DF election functions described herein.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
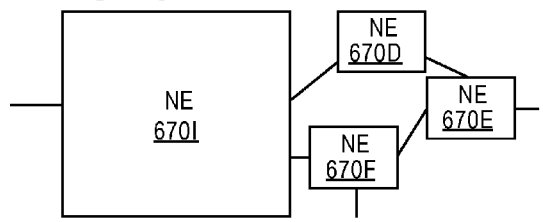
FIG. 6E illustrates the simple case of where each of the NDs implements a single NE, but a centralized control plane has abstracted multiple of the NEs in different NDs into (to represent) a single NE in one of the virtual network(s), according to some embodiments of the invention.
Figure 6F:
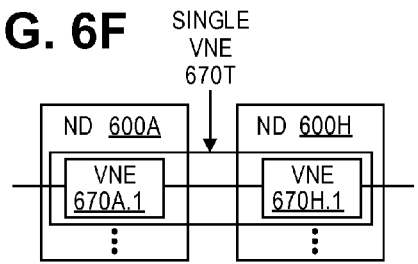
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
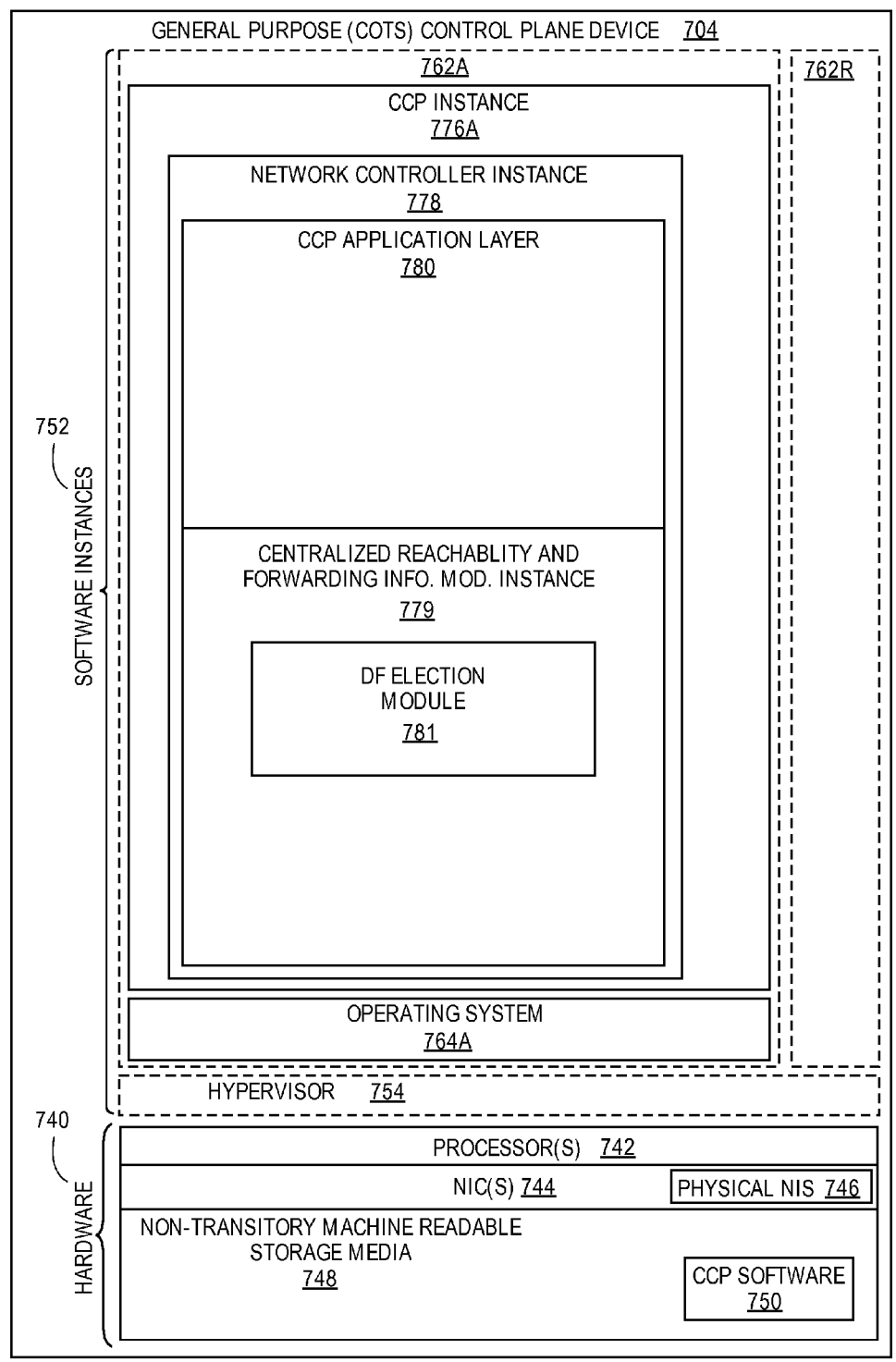
FIG. 7 illustrates a general purpose control plane device with centralized control plane (CCP) software, according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein centralized control plane (CCP) software 750.

In embodiments that use compute virtualization, the processor(s) 742 typically execute software to instantiate a virtualization layer 754 and software container(s) 762A-R (e.g., with operating system-level virtualization, the virtualization layer 754 represents the kernel of an operating system (or a shim executing on a base operating system) that allows for the creation of multiple software containers 762A-R (representing separate user space instances and also called virtualization engines, virtual private servers, or jails) that may each be used to execute a set of one or more applications; with full virtualization, the virtualization layer 754 represents a hypervisor (sometimes referred to as a virtual machine monitor (VMM)) or a hypervisor executing on top of a host operating system, and the software containers 762A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 750 (illustrated as CCP instance 776A) is executed within the software container 762A on the virtualization layer 754. In embodiments where compute virtualization is not used, the CCP instance 776A on top of a host operating system is executed on the "bare metal" general purpose control plane device 704. The instantiation of the CCP instance 776A, as well as the virtualization layer 754 and software containers 762A-R if implemented, are collectively referred to as software instance(s) 752.

In some embodiments, the CCP instance 776A includes a network controller instance 778. The network controller instance 778 includes a centralized reachability and forwarding information module instance 779 (which is a middleware layer providing the context of the network controller 678 to the operating system and communicating with the various NEs), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 676 works with virtual network view(s) (logical view(s) of the network) and the middleware layer provides the conversion from the virtual networks to the physical view.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

In some embodiments, the CCP application layer 780 can implement the DF election module 781, which implements the DF election process described herein.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a network device functioning as a provider edge (PE) device to determine a designated forwarder (DF) for sending broadcast, unknown unicast or multicast (BUM) traffic to a customer edge (CE) device, which is connected to a plurality of PE devices in an Ethernet virtual private network (EVPN) instance on a given Ethernet segment, where the method reduces a time for DF determination and loss of traffic for the CE device, the method comprising:
  determining whether a number of active links from the network device to the CE device is greater than an active link minimum; and
  determining that the network device is the DF in response to determining that the number of active links is greater than the active link minimum, where the CE device prioritizes link activation such that only a single PE device in the plurality of PE devices has a number of active links that is greater than the active link minimum.

2. The method of claim 1, further comprising:
  determining that the network device is not the DF in response to determining that the number of active links is less than or equal to the active link minimum.

3. The method of claim 1, further comprising:
  receiving notification of the active link minimum from the CE device.

4. The method of claim 1, wherein the plurality of PE devices form a link aggregation group (LAG) with the CE device.

5. The method of claim 4, wherein the active link minimum is communicated to the network device using link aggregation control protocol (LACP).

6. A method implemented by a network device functioning as a customer edge (CE) device to facilitate determination of a designated forwarder (DF) for sending broadcast, unknown unicast or multicast (BUM) traffic from a plurality of provider edge (PE) devices in an Ethernet virtual private network (EVPN) instance on a given Ethernet segment, where the method reduces a time for DF determination and loss of traffic for the CE device, the method comprising:
  determining a set of priorities for links between the network device and the plurality of PE devices, where each PE device in the plurality of PE devices has one active link to the network device with a highest priority, and remaining links to the network device have decreasing priority without overlap between the PE devices in the plurality of PE devices;
  determining an active link minimum based on a total number of links to be active in the Ethernet segment; and
  reassigning active links between the network device and the PE devices according to the set of priorities for the links thereby identifying a new DF, in response to a change in connection of PE devices to the Ethernet segment.

7. The method of claim 6, further comprising:
  distributing the active link minimum to each PE device in the plurality of PE devices.

8. The method of claim 6, further comprising:
  activating links according to the set of priorities.

9. A network device functioning as a provider edge (PE) device to implement a method to determine a designated forwarder (DF) for sending broadcast, unknown unicast or multicast (BUM) traffic to a customer edge (CE) device, which is connected to a plurality of PE devices in an Ethernet virtual private network (EVPN) instance on a given Ethernet segment, where the method reduces a time for DF determination and loss of traffic for the CE device, the network device comprising:
  a non-transitory machine-readable medium having stored therein a DF election module; and
  a processor coupled to the non-transitory machine-readable medium, the processor configured to execute the DF election module, the DF election module to determine whether a number of active links from the network device to the CE device is greater than an active link minimum, and determine that the network device is the DF in response to determining that the number of active links is greater than the active link minimum, where the CE device prioritizes link activation such that only a single PE device in the plurality of PE devices has a number of active links that is greater than the active link minimum.

10. The network device of claim 9, wherein the DF election module is further configured to determine that the network device is not the DF in response to determining that the number of active links is less than or equal to the active link minimum.

11. The network device of claim 9, wherein the DF election module is further configured to receive notification of the active link minimum from the CE device.

12. The network device of claim 9, wherein the plurality of PE devices form a link aggregation group (LAG) with the CE device.

13. The network device of claim 12, wherein the active link minimum is communicated to the network device using link aggregation control protocol (LACP).

14. A network device functioning as a customer edge (CE) device to implement a method to facilitate determination of a designated forwarder (DF) for sending broadcast, unknown unicast or multicast (BUM) traffic from a plurality of provider edge (PE) devices in an Ethernet virtual private network (EVPN) instance on a given Ethernet segment, where the method reduces a time for DF determination and loss of traffic for the CE device, the network device comprising:
  a non-transitory machine-readable medium having stored therein a DF election module; and
  a processor coupled to the non-transitory machine-readable medium, the processor configured to execute the DF election module, the DF election module to determine a set of priorities for links between the network device and the plurality of PE devices, where each PE device in the plurality of PE devices has one active link to the network device with a highest priority, and remaining links to the network device have decreasing priority without overlap between the PE devices in the plurality of PE devices, to determine an active link minimum based on a total number of links to be active in the Ethernet segment, and to reassign active links between the network device and the PE devices according to the set of priorities for the links thereby identifying a new DF, in response to a change in connection of PE devices to the Ethernet segment.

15. The network device of claim 14, wherein the DF election module is further configured to distribute the active link minimum to each PE device in the plurality of PE devices.

16. The network device of claim 14, wherein the DF election module is further configured to activate links according to the set of priorities.

* * * * *